No. 839,038. PATENTED DEC. 18, 1906.
K. SCHAAL.
HARROW ATTACHMENT FOR SULKY PLOWS.
APPLICATION FILED JULY 14, 1906.

3 SHEETS—SHEET 1.

Witnesses
Geo. Ackman
Wm. Bagger

Inventor
Karl Schaal,
By Victor J. Evans
Attorney

No. 839,038. PATENTED DEC. 18, 1906.
K. SCHAAL.
HARROW ATTACHMENT FOR SULKY PLOWS.
APPLICATION FILED JULY 14, 1906.

3 SHEETS—SHEET 2.

Witnesses
Geo. Ackman Jr.
Wm. Bagger

Inventor
Karl Schaal,
By Victor J. Evans.
Attorney

No. 839,038. PATENTED DEC. 18, 1906.
K. SCHAAL.
HARROW ATTACHMENT FOR SULKY PLOWS.
APPLICATION FILED JULY 14, 1906.
3 SHEETS—SHEET 3.
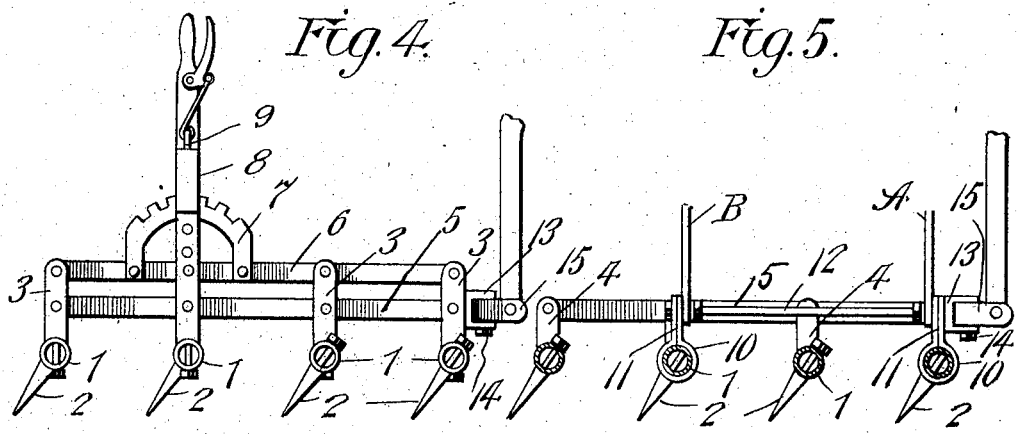
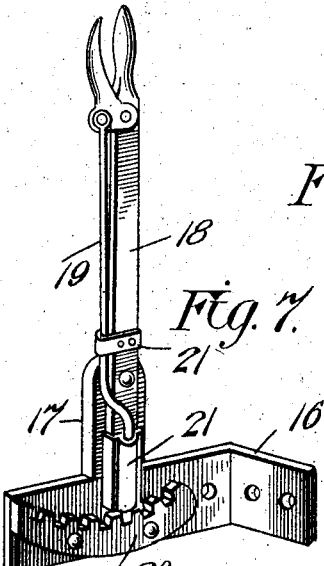
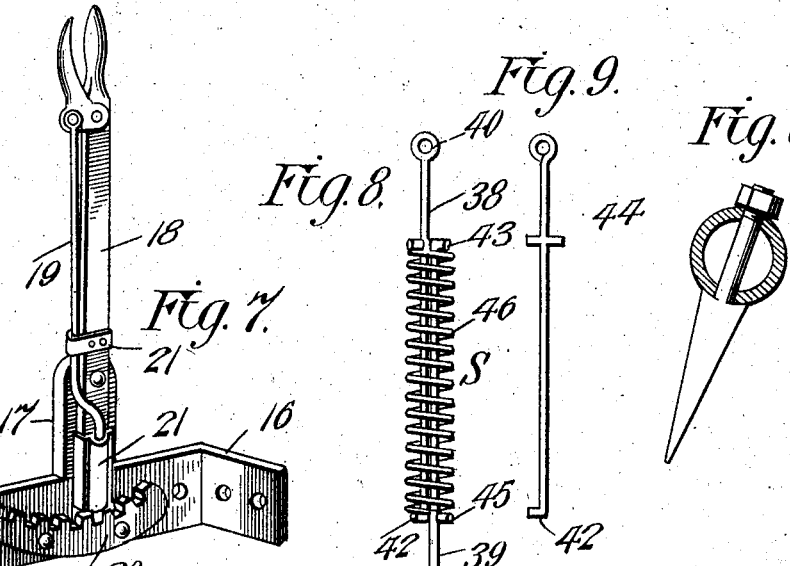
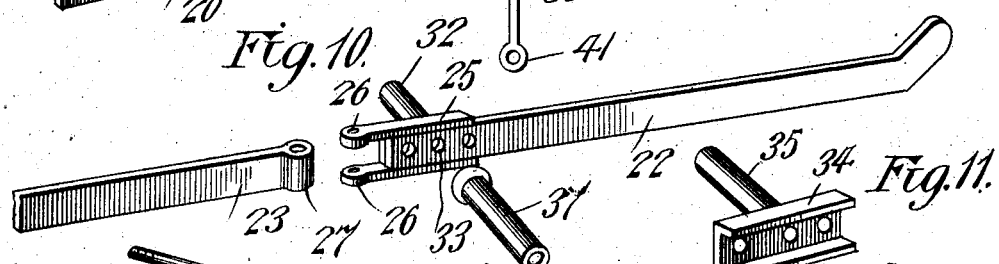
Witnesses
Geo. Ackman
Wm. Bagger
Inventor
Karl Schaal
By Victor J. Evans
Attorney
THE NORRIS PETERS CO., WASHINGTON, D. C.

UNITED STATES PATENT OFFICE.

KARL SCHAAL, OF SEWARD, NEBRASKA.

HARROW ATTACHMENT FOR SULKY-PLOWS.

No. 839,038.　　　　Specification of Letters Patent.　　　　Patented Dec. 18, 1906.

Application filed July 14, 1906. Serial No. 326,213.

*To all whom it may concern:*

Be it known that I, KARL SCHAAL, a citizen of the United States, residing at Seward, in the county of Seward and State of Nebraska, have invented new and useful Improvements in Harrow Attachments for Sulky-Plows, of which the following is a specification.

This invention relates to harrow attachments for plows; and it has particular reference to an improved harrow attachment adapted to be applied to and used in connection with sulky-plows or riding-plows of ordinary construction.

One object of the invention is to provide a simple and efficient harrow attachment which may be readily applied or attached to the frame of an ordinary sulky-plow in such a manner as to operate upon the furrow slice immediately behind the turning-plow, so as to break up the clods and pulverize the soil while the latter is yet comparatively moist and before it becomes baked and caked by exposure to the sun and air, another important advantage being that by the improved attachment I am enabled to perform at a single operation the plowing and harrowing which have heretofore usually required going over the ground twice in the performance.

Another object of the invention is to provide improved means for supporting and adjusting the harrow attachment.

Further objects of the invention are to simplify and improve the construction and operation of this class of devices.

With these and other ends in view, which will readily appear as the nature of the invention is better understood, the same consists in the improved construction, arrangement, and combination of parts, which will be hereinafter fully described, and particularly pointed out in the claims.

In the accompanying drawings has been shown a simple and preferred form of the invention, it being, however, understood that no limitation is necessarily made to the precise structural details therein exhibited, but that changes, alterations, and modifications within the scope of the invention may be resorted to when desired.

Figure 1:
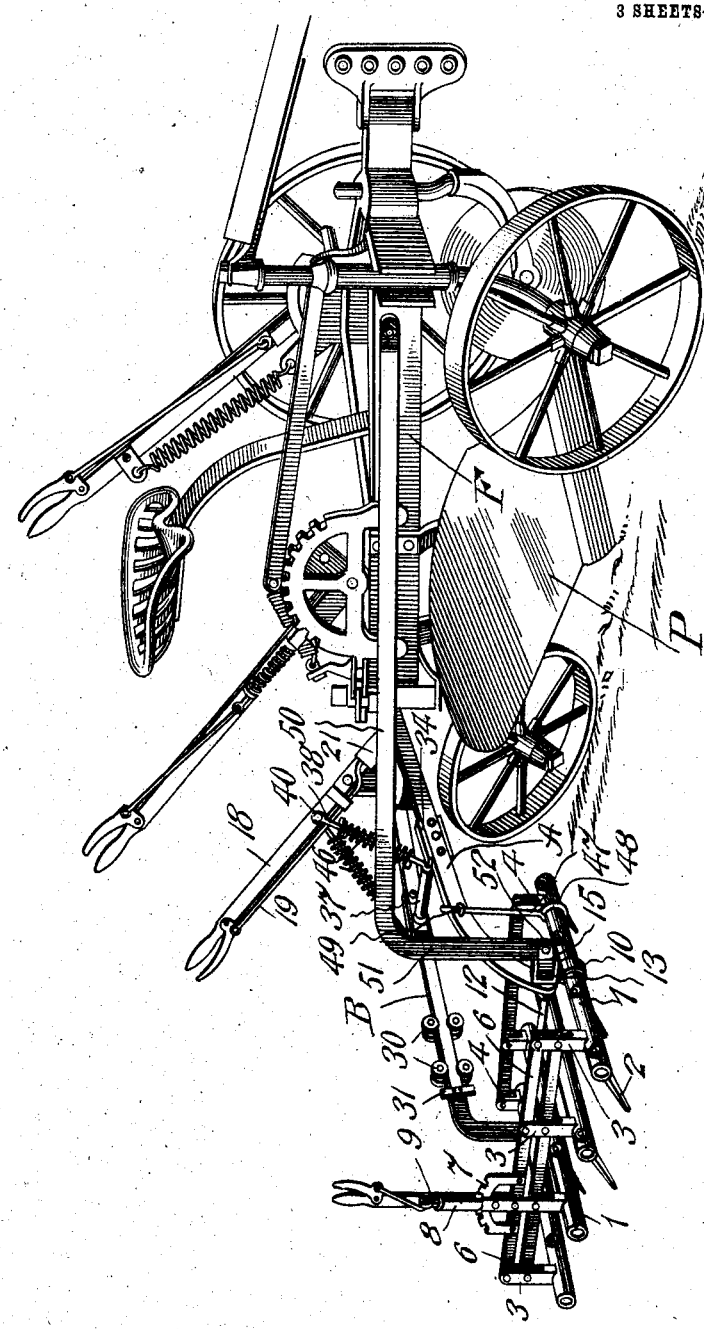
Figure 2:
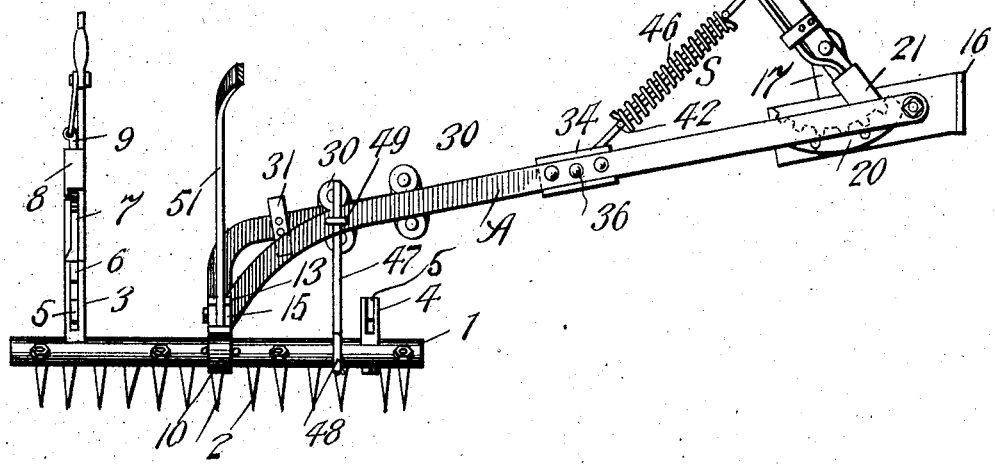
Figure 3:
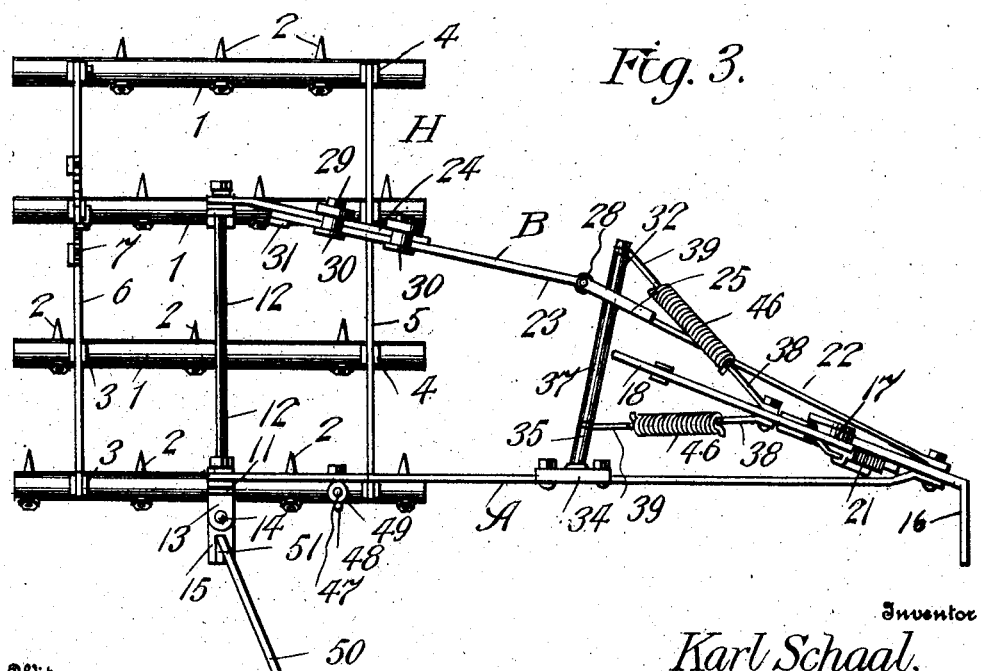

In the drawings, Figure 1 is a perspective view showing the improved harrow attachment applied to a sulky-plow of ordinary construction in position for operation. Fig. 2 is a front elevation of the harrow attachment removed from the plow. Fig. 3 is a top plan view showing the harrow attachment removed. Fig. 4 is a side elevation of the harrow. Fig. 5 is a longitudinal sectional view of the harrow. Fig. 6 is a sectional detail view taken through one of the tubular harrow-bars. Fig. 7 is a perspective detail view of the securing plate or bracket and the adjusting-lever carried thereby. Fig. 8 is a detail view of one of the adjusting-springs. Fig. 9 is a detail view of one of the spring-carrying rods. Figs. 10, 11, and 12 are detail views of parts of the frame of the harrow attachment.

Corresponding parts in the several figures are denoted by like characters of reference.

The harrow H, which is a part of the improved attachment or appliance, may be of any suitable and convenient construction possessing the requisites of lightness, strength, and general efficiency to operate upon the soil. As the harrow is usually intended to operate upon a single furrow slice only, it need not be large. In the drawings has been shown a harrow composed of a plurality of tubular bars 1 1, having teeth or spikes 2 2 and provided with upward-extending arms 3 4, connected pivotally with longitudinal bars 5, which may be regarded as constituting the harrow-frame. The upper ends of the arms 3, which latter are longer than the arms 4, are pivotally connected by a link-bar 6, carrying a segment-rack 7. A lever 8, pivotally connected with the link-bar 6 and with the adjacent harrow-bar 5, is provided with a stop member 9, adapted for engagement with the rack for the purpose of retaining the parts controlled thereby in position when adjusted. It will be seen that by this simple mechanism the teeth or spikes of the harrow may be adjusted to and secured in position at various inclinations and also that the toothed harrow-bars may be rocked or oscillated in order to effect the discharge therefrom of any trash accumulated thereby.

Two of the tubular spiked harrow-bars, one of which is the front bar of the harrow, are provided with sleeves or clips 10, in which they may turn freely and which are provided with upward extensions 11 for the passage of a rod or bolt 12, upon the front end of which there is swiveled a clip 13, having a bolt 14, upon which a clevis 15 is hingedly mounted, said clevis coöperating with the clip 13 to form a universal joint or coupling. The rod 12 and clevis 15 constitute the connecting means whereby the harrow is connected with the frame by means of which it is attached to a plow, as will be presently more fully described.

16 represents an angular plate or bracket which is suitably bolted or otherwise secured upon the frame F of an ordinary riding-plow P, which may be of any desired construction. The angular plate or bracket 16 has an upward-extending lug 17, upon which is pivoted a lever 18, having a stop member 19, adapted for engagement with a curved rack-bar 20, which is secured upon the plate or bracket, the stop member being guided through sleeves or guides 21, whereby it is braced and reinforced.

The rod or bolt 12 of the harrow is connected with the plate or bracket 16 by means of front and rear arms A and B, the former of which is a stiff rigid arm or connecting member, while the latter, B, is a compound arm composed of three members or sections 22, 23, and 24. One end of the section 22 is bolted upon the angle plate or bracket 16, and the opposite end of said section carries a hinge member or casting 25, having apertured lugs 26 for the reception between them of the inner end of the section 23, which has an eye 27 for the passage of an approximately vertical pivot pin or pintle 28, upon which the section 23 may swing in an approximately horizontal plane. The outermost section 24 is secured at its outer end upon the rod or bolt 12, and at its opposite end it carries a plate or casting 29, provided with flanged rollers 30, between which the outer end of the section 23 is slidably mounted, said section 23 being provided at its outer extremity with a cross-piece 31 to prevent it from escaping from between the guide-rollers 30.

The casting or hinge member 25 is provided with a laterally-extending sleeve 32, disposed in line with an aperture 33 in the section 22 of the arm B. Firmly bolted or otherwise secured upon the arm A is a flanged plate or casting 34, having a laterally-extending sleeve 35, which is disposed in registry with a perforation of the said arm. A bolt or connecting member 36 extends through the arms A and B and through the sleeves 35 and 32 of the castings connected to said arms, and upon said bolt, between the sleeve 35 and the arm B, there is also mounted a spacing-sleeve 37 for the purpose of keeping the parts properly spaced apart.

The lever 18, which is used for the purpose of adjusting the harrow and for retaining the same in adjusted position, is connected with the bolt 36 by means of extension members S, each of which is composed of a pair of rods 38 and 39, having terminal eyes 40 41 at the ends, which are connected, respectively, with the lever 18 and with the bolt 36 and provided at their opposite ends with terminal hooks 42 43. Said rods are also provided near the ends having the eyes 40 41 with cross-bars 44 45. The rods 38 39 are placed in juxtaposition, and springs 46 are coiled upon said rods between the hooked ends and the cross-bars of the latter. It will thus be seen that the rods 38 39 are slidably connected with each other in such a manner that the springs S will be tensioned either by extending the rods or by collapsing the same. By this construction it will be seen that when the adjusting-lever is manipulated to raise the arms A B, so as to lift the harrow from the ground, the said harrow will be resiliently supported and will ride easily and without jarring, when, on the other hand, the harrow is moved in a downward direction to force the teeth or spikes into the ground it will be subject to pressure by the springs S, whereby the teeth or spikes will be held resiliently in engagement with the ground. This is an important feature of the invention, since by this construction the harrow may be subjected to any desired pressure for the purpose of causing the teeth to enter the desired distance into the soil, and at the same time if obstructions should be encountered the harrow is capable of rising, so as to ride over such obstructions without danger of breakage.

Suitably connected with the front harrow-bar 1, near the inner end of said bar, is a rod 47, having an eye 48 engaging the harrow-bar, from which the said rod extends in an upward direction. The upper end of said rod is confined in an eyebolt 49, connected with the arm A. The object of this rod is simply to keep the harrow from tilting or toppling over when it is raised from the ground. It is obvious that this rod may also be utilized for the purpose of securing the harrow in a somewhat-inclined position if for any reason it should be found desirable to do so.

A draft-bar or connecting member 50 is suitably secured to one side of the plow-frame F, and the rear end of said draft-bar is extended downwardly, as shown at 51, and is connected, as by means of a pin or bolt 52, with the clevis 15 at the front end of the harrow. This member not only constitutes a draw-bar, but it also serves to prevent the harrow from crowding in a forward direction and to retain it in the desired position.

From the foregoing description, taken in connection with the drawings hereto annexed, the operation and advantages of this invention will be readily understood by those skilled in the art to which it appertains.

It is obviously desired to harrow the soil in order to break the clods and pulverize the dirt at the earliest moment possible after plowing, especially in arid sections, where the soil that is turned by the process of plowing is apt to become quickly caked to a hard condition, where it is difficult to break and pulverize it successfully.

By the present invention means are provided for harrowing, so as to break and pulverize the soil simultaneously with plowing, ande the harrow of the present invention is constructed and attached to the riding-plow in such a manner that the strain upon the team will not be materially increased.

The harrow attachment may be very easily and conveniently adjusted so as to cause the teeth or spikes to enter the desired distance into the soil, and the harrow attachment may be likewise very easily elevated from the ground and supported in a raised and inoperative position. When the plow is turned at the corners of the field or at the ends of the furrow, the sections 23 and 24 of the arms B will collapse, so that the plow may be turned prior to the turning of the harrow, this movement being made possible by the presence of the hinge-joint which connects the sections 22 and 23 of the said arm B. When the plow has been turned and moves again in a forward direction, the strain exercised by the draft-bar 50 will serve to swing the harrow around to the proper position for movement in a forward direction.

It is obvious that the connections between the various parts of the device—for instance, the connections of the arms A and B with the bolt 12— should be sufficiently loose to enable the parts to move and operate freely in the manner and for the purpose described.

I desire it to be understood that in the practical manufacture of this apparatus I do not regard myself as limited to the precise construction herein described, inasmuch as many departures from said construction may be made within the scope of the invention.

Having thus described the invention, what is claimed is—

1. In a harrow attachment for riding-plows, a harrow having a plurality of rocking spiked bars, clips upon two of said bars, a rod connecting said clips, supporting-arms engaging said rod, and a rod provided at one end with an eye engaging one of the spiked harrow-bars near the end of the latter and having its opposite end confined in an eyebolt connected with one of the supporting-arms.

2. In a harrow attachment for riding-plows, a harrow having a plurality of rocking spiked bars, clips connected with two of said bars, a rod connecting said clips, and supporting-arms hingedly engaging said rod, the opposite ends of said supporting-arms being connected with a supporting-plate; one of said arms being composed of collapsible sections.

3. In a harrow attachment for riding-plows, a harrow, clips affording bearings for two of the harrow-bars, a rod connecting said clips, supporting-arms hingedly engaging said rod one of said arms being composed of collapsible sections, and a member connecting one of the harrow-bars with the upper supporting-arm to restrain the harrow from tilting.

4. In a harrow attachment for riding-plows, a harrow, a rod connected therewith, supporting-arms hingedly engaging said rod, a supporting-plate connected with the opposite ends of the arms, an adjusting-lever pivoted upon the supporting-plate, and resilient extensible and collapsible links connecting the lever with the supporting-arms.

5. In a harrow attachment for riding-plows, a harrow, a rod connected therewith, supporting-arms hingedly engaging said rod, one of said arms having a hinge-joint and a plurality of collapsible sections, a supporting-plate connected with the opposite ends of the arms, spacing and connecting means for the latter, a lever pivoted upon the supporting-plate, means for retaining said lever in position at various adjustments, and resilient extensible and collapsible links connecting the lever with the spacing and connecting means of the supporting-arms.

6. In a harrow attachment for riding-plows, a supporting-plate, a harrow, arms connecting the supporting-plate with the harrow, one of said arms being provided with a hinge-joint and with a plurality of collapsible members, a rod connecting the harrow with the upper supporting-arm to prevent the harrow from tilting, an adjusting-lever, means for spacing and connecting the supporting-arms, and resilient links connecting said spacing means with the adjusting-lever.

7. In a harrow attachment for riding-plows, a supporting-plate, a harrow, supporting-arms connecting the harrow with the plate, one of said supporting-arms having a hinge-joint and a plurality of slidably-connected sections, one of said sections being equipped with flanged rollers engaging the adjacent section, a sleeve extending laterally from the hinge member, a casting upon the opposite supporting-arm having a laterally-extending sleeve, a connecting-bolt extending through the sleeves and the supporting-arms, an adjusting-lever upon the supporting-frame, and resilient links connecting said lever with the bolt connecting the supporting-arms.

8. In a device of the class described, a supporting-plate, a harrow, arms connecting the latter with the supporting-plate, an adjusting-lever pivoted upon the latter, a bolt connecting the supporting-arms, and links connecting said bolt with the adjusting-lever; each of said links comprising a pair of rods having terminal hooks and eyes and provided with cross-bars near their terminal eyes, and springs coiled upon said rods between the cross-bars and the terminal hooks.

9. In a harrow attachment for riding-plows, a harrow having rocking spiked bars, clips engaging and affording bearings for two of the bars, a bolt connecting said clips, a clip swiveled upon the front end of the bolt, a clevis connected with said clip, supporting-arms connected with the bolt, and a draft-bar connected with the clevis and adapted to be connected with the frame of the plow to which the harrow attachment is applied.

In testimony whereof I affix my signature in presence of two witnesses.

KARL SCHAAL.

Witnesses:
    JOHN KAMPEN,
    E. JACOBS.